(12) United States Patent
Larsen et al.

(10) Patent No.: US 6,952,481 B2
(45) Date of Patent: Oct. 4, 2005

(54) HEADSET

(75) Inventors: Leo Larsen, Kokkedal (DK); Peter Møller, Kokkedal (DK)

(73) Assignee: GN Netcom A/S, Ballerup (DK)

( * ) Notice: Subject to any disclaimer, the term of this patent is extended or adjusted under 35 U.S.C. 154(b) by 372 days.

(21) Appl. No.: 09/886,304

(22) Filed: Jun. 21, 2001

(65) Prior Publication Data

US 2002/0141571 A1 Oct. 3, 2002

Related U.S. Application Data

(63) Continuation of application No. PCT/DK99/00696, filed on Dec. 13, 1999.

(30) Foreign Application Priority Data

Dec. 23, 1998 (DK) .......................................... 1998 01716

(51) Int. Cl.[7] .................................................. H04R 1/10
(52) U.S. Cl. ......................................... 381/74; 379/430
(58) Field of Search .......................... 381/74, 104, 106, 381/107, 98, 309, 23.1; 379/430

(56) References Cited

U.S. PATENT DOCUMENTS

| | | |
|---|---|---|
| 5,058,155 A | 10/1991 | Larsen |
| 5,235,637 A | 8/1993 | Kraz et al. |
| 5,353,347 A | 10/1994 | Irissou et al. |
| 5,371,803 A | 12/1994 | Williamson |
| 5,450,496 A | 9/1995 | Burris et al. |
| 5,832,075 A | 11/1998 | Gancarcik |
| 5,978,689 A | * 11/1999 | Tuoriniemi et al. ...... 455/569.1 |

FOREIGN PATENT DOCUMENTS

| | | |
|---|---|---|
| GB | 1183232 A | 3/1970 |
| WO | WO 98/47311 | 10/1998 |

OTHER PUBLICATIONS

International Search Report for PCT/DK99/006962.

* cited by examiner

*Primary Examiner*—Ping Lee
(74) *Attorney, Agent, or Firm*—Altera Law Group, LLC

(57) ABSTRACT

Headset for connection to a telephone apparatus, said headset comprising a capsule with a built-in receiver, and on which there is mounted a boom with a microphone. The headset is connected to a telephone apparatus by means of a wire with associated jack connection, and the headset has associated amplification and adjustment circuits for both the microphone and receiver, manual operating elements for the setting of said amplification and adjustment circuits, and switch elements for changeover depending partly on the type of microphone in the telephone apparatus and partly on the polarity of the telephone apparatus' microphone and receiver wires. The amplification and adjustment circuits are built into the headset capsule, so that the use of a separate connection box is avoided, and the manual operation elements are placed on the capsule. The switching elements consist of a multi-position switch, which is placed in the capsule in such a manner that it is accessible for operation.

6 Claims, 2 Drawing Sheets

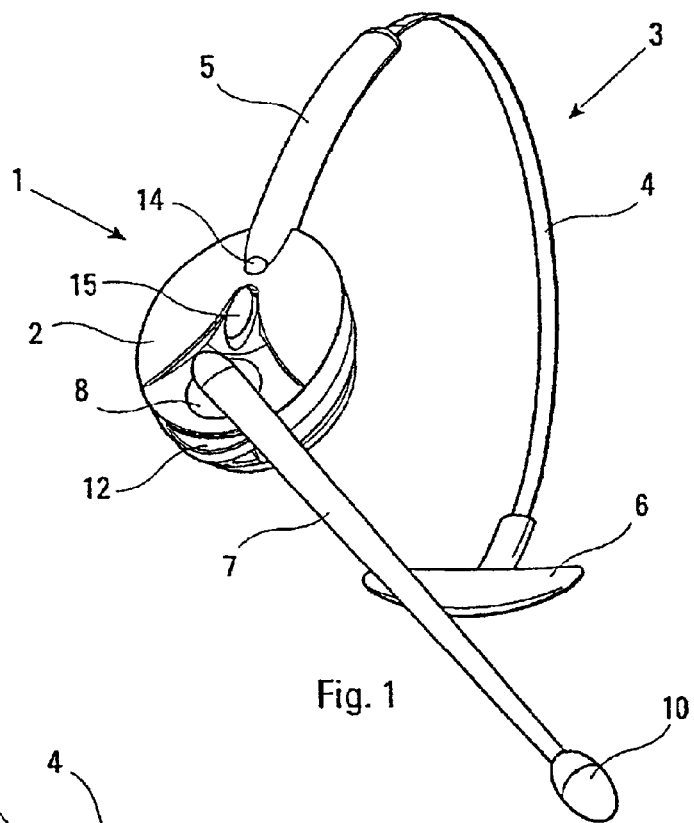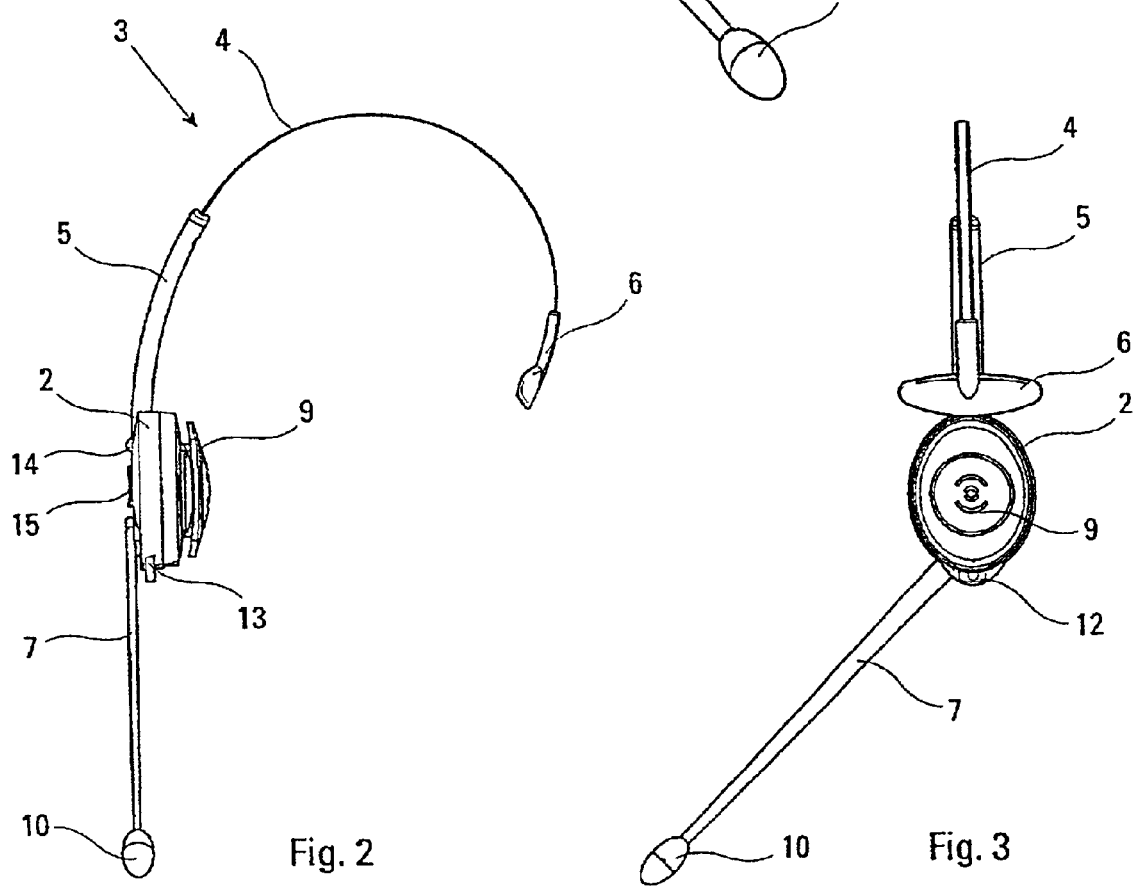

HEADSET

Figure 4:
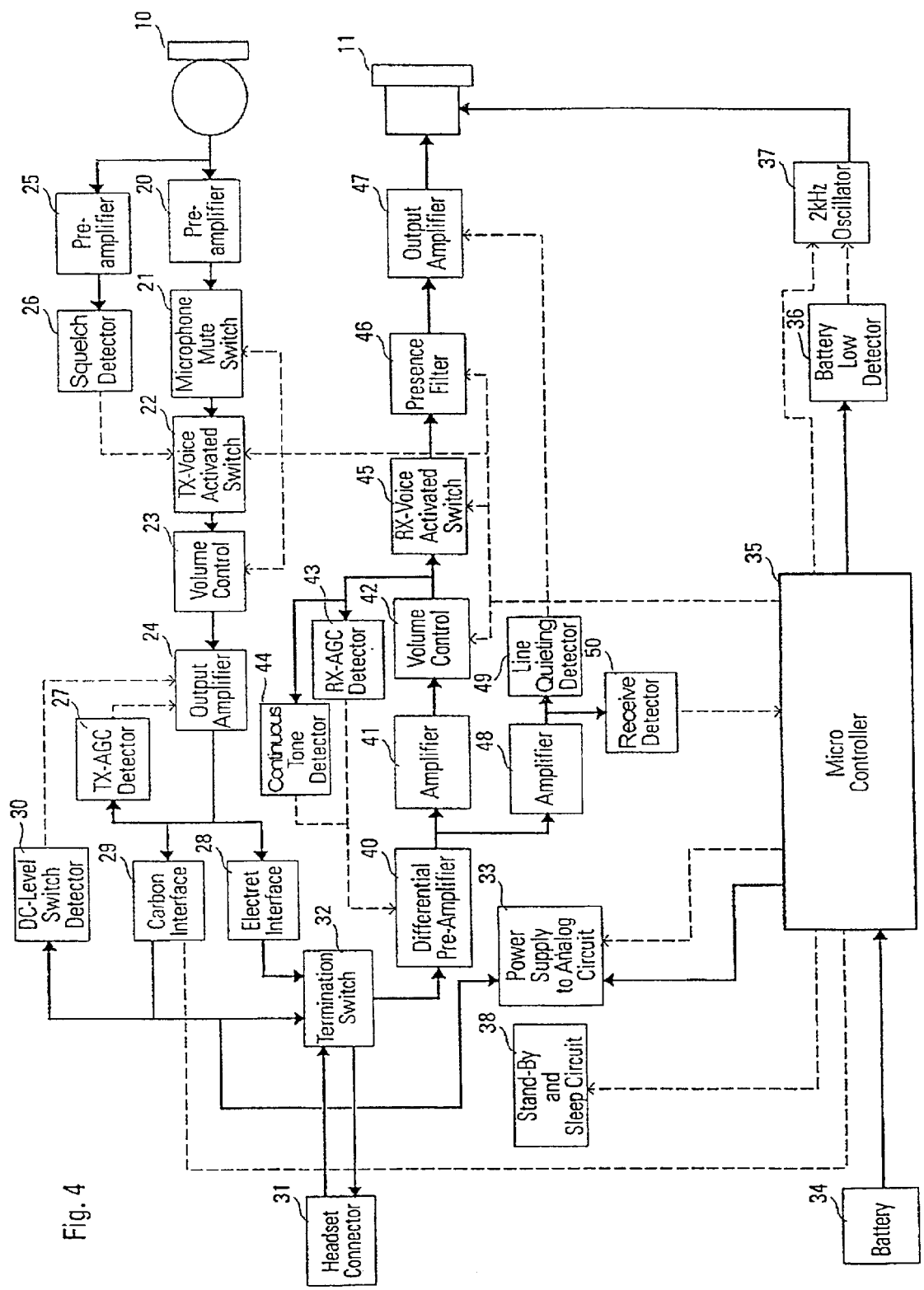

This application is a continuation of International application Ser. No. PCT/DK99/00696, filed Dec. 13, 1999.

The invention concerns a headset for connection to a telephone apparatus, said headset comprising a capsule with a built-in receiver, and on which there is mounted a boom with a microphone, and said headset being connected to a telephone apparatus by means of a wire with associated connection jack. The headset includes amplification and adjustment circuits for both the microphone and receiver, manual operation elements for the setting of said amplification and adjustment circuits, and switching elements for changeover partly depending on the type of microphone on the telephone, and partly depending on the polarity of the telephone apparatus' microphone and receiver wires.

Headsets of this kind are configured in such a manner that they can be connected to telephones of different types and makes. Thus, there is possibility for changeover depending on the type of microphone with which the host telephone is provided, in that the host telephone can, for example, be provided with a carbon microphone, an electret microphone or an electro-dynamic microphone, and will be configured in accordance herewith.

Moreover, where different types of telephones are concerned, the impedance levels and signal levels for both the transmission side and receiving side can be different, which means that there is need for the adjustment of these if a headset is to be able to be used for different types of telephones. Finally, the jack connections between the telephone and handset and/or headset can involve different positioning of receiver and transmission wires, which means that a changeover of these connections is also required in order for a headset to be able to be used for different types of telephones.

The known headsets are therefore provided both with the said amplification and adjustment circuits and operating elements for use in the adjustment of these, and also the said switching elements for changeover depending on the type of microphone and the polarity of the jack connections on the host telephone. These circuits and components are built into a separate unit, which is placed between the host telephone and the headset.

For example, such a headset is known from U.S. Pat. No. 5,058,155, which comprises a connection box into which the amplifier and adjustment circuits and operating elements and switching elements are built, in that the box is connected to the host telephone by a wire connection, and where the headset is similarly connected to the connection box by a wire connection.

It is a disadvantage with the known headsets of this kind that use must be made of such a separate connection box, in that there must be room for this to be placed in the vicinity of the host telephone, e.g. on a desk or the like, with the result that this gives rise to disadvantages of a space-demanding character, and with the risk that such a box is tipped over or pushed in such a manner that the cable connections are broken etc. It is a further disadvantage that adjustments which are required to be made on the headset must be effected by means of the operating elements which are to be found on the connection box. Consequently, it is necessary for the user of the headset to be able to operate the connection box, which means that the connection box must be directly accessible and therefore cannot be placed in a concealed manner.

It is also known in connection with headsets of the general kind that there can be operating buttons and similar operating equipment mounted on the headset.

It is thus known from U.S. Patent publication No. 5,450,496 for a headset to have a built-in switch and a built-in volume control.

Moreover, it is known from WO 98/47311 that a headset can house a battery, a circuit board and similar electronic parts.

However, these known headsets are not related with the problems discussed above, where an adjustment must be made between a host telephone and a headset, and these known headsets will thus not be able to be used in connection with host telephones of different types without having to use a connection box with the necessary adjustment and amplification circuits and the necessary switching elements.

An object of the invention is thus to configure a headset of the kind disclosed in the preamble whereby the said disadvantages are avoided. This is achieved by building the amplification and adjustment circuits into the capsule, that the manual operation elements are placed on the capsule, and that the switching elements consist of a multi-position switch, which is placed in the capsule in such a manner that it is accessible for operation.

It is hereby achieved that the separate connection box can be completely dispensed with, at the same time that both the setting of the headset, so that it is compatible with the relevant host telephone, and the daily operation of the headset can be effected by means of the operating elements which are placed on the headset's capsule.

The number of manual operating elements which must be placed on the headset can be limited to a minimum, in that an operating element which is used to suppress or disconnect the signal from the headset microphone, and an adjustment element for the level of volume from the headset's receiver, can at the same time be used for the setting of the headset's amplification and adjustment circuits. It is hereby achieved that all necessary switching and operation functions can be realised in connection with a headset which has a capsule of relatively limited size, in that the operation elements have several different functions. This can be expediently effected while making use of a micro-controller which is included in the headset and which controls the circuits in question.

The headset can also include a filter circuit in the receive signal path, this filter circuit accentuating that frequency band in which human speech normally takes place. This filter circuit will thus be able to make the speech sound received easier to understand for the user, especially in situations with background noise or poor transmission conditions for the telephone signal. It can be expedient for this filter circuit to be coupled in by the user by means of the manual operating elements, so that the user, depending on the actual situation and personal preferences, can freely choose whether the filter is to be coupled in or de-coupled.

The receive signal path can also include a voice-activated switch which reduces the amplification in the receive signal path when the signal received lies below a given level, e.g. corresponding to the level of normal speech. The background noise from the telephone line will hereby be reduced when no speech signal is being received. According to the embodiment disclosed in claim 7, whether this circuit is to be coupled or de-coupled can also be freely chosen by the user.

The receive signal path can be provided with a detector which can detect whether the headset is in use, and which after a given period of time reduces the amplification in the output amplifier and hereby removes the background noise from the telephone line. When a speech signal appears again in the receive signal path, the amplification is correspondingly brought up to a normal level again.

With an expedient embodiment the transmission signal path can also comprise a voice-activated switch which reduces the amplification in the transmission signal path when the signal in the transmission signal path lies below a given level, e.g. corresponding to the level of normal speech. The background noise will hereby be reduced when no speech signal is being transmitted.

Finally, the headset can include a signal generator which can cause audible signals, e.g. with easily-identifiable sound patterns, to inform the user of certain conditions, such as e.g. that the battery in the headset must be changed, or that the headset has been brought into a certain state, such as e.g. that the microphone has been disconnected or that the filter circuit has been coupled or de-coupled.

In the following, the invention will be explained in more detail with reference to the drawings, where FIG. 1 shows a headset according to the invention, seen in perspective at an angle from the front and from the right-hand side, FIG. 2 shows the headset shown in FIG. 1 seen directly from the front, FIG. 3 shows the headset shown in FIG. 1 seen from the left-hand side, and FIG. 4 shows a block diagram of a circuit provided in the headset according to the invention.

In FIGS. 1, 2 and 3 is shown the physical configuration of a headset 1 according to the invention. The headset consists of a capsule 2, which is connected at the top to a headband 3 with which the headset is secured on the head of the user. The headband 3 consists of a flexible headpiece 4 which at the capsule 2 is fastened in an adjustment piece 5, and which at its other end terminates in a T-piece 6. The adjustment piece 5 is firmly connected to the capsule 2, and is arranged in such a manner that the one end of the flexible headpiece can be displaced inside the adjustment piece, so that the headband 3 can be adjusted to suit the head of the user. The T-piece 6 serves as a support for the other end of the flexible piece 4 against the user's head. When the headset 1 is used, the flexible piece 4 is displaced precisely so far into the adjustment piece 5 that the T-piece 6 will rest against the user's head over the one ear when the headset capsule 2 is disposed opposite the other ear.

On the capsule 2 there is also mounted a microphone boom 7 which at its free end secures a microphone 10. The microphone boom 7 is mounted on the capsule 2 by a pivotal coupling 8, which is configured in such a manner that the microphone boom 7 can be placed in a position suitable for the user. In FIGS. 1–3, the microphone boom 7 is shown in a position corresponding to the user wearing the headset with the capsule against the right ear, but the headset might as well be worn with the capsule 2 against the left ear, in that the microphone boom 7 shall thus merely be turned over into the position corresponding hereto (for example corresponding to a turning of approx. a quarter of a turn towards the left in the example shown in FIG. 1). Moreover, the microphone boom 7 is made of a flexible material, so that the microphone can be positioned at a suitable distance from the mouth of the user.

The capsule 2 contains a receiver 11 (not shown in FIGS. 1–3), which lies behind an ear pad 9 (FIGS. 2 and 3). This ear pad can be removed, in that it is secured to the capsule by a bayonet coupling. The turning of the ear pad at an angle of e.g. approx. 45° will thus enable the ear pad to be drawn away from the capsule 2. When the ear pad 9 has been removed, there will be access, as described later, to a multi-position changeover switch (not shown in FIGS. 1–3).

As will be described later, the capsule also includes the circuits which are necessary for driving the headset, and one or possibly more batteries (not shown in FIGS. 1–3) which are disposed in a battery drawer 12 which can be opened, in that it can be turned out of the capsule by the activation of a latch 13 (FIG. 2). Finally, on that side of the capsule, which faces away from the head of the user, there is a button 14 for operation of a microphone switch and a button 15 for adjustment of the volume.

From the headset there extends a wire (not shown) with a jack connection with which the headset can be coupled to a telephone apparatus, also called the host telephone (not shown), either in a jack for a headset, providing such a jack is provided on the telephone apparatus, or alternatively in the jack for the handset. At a suitable place on this wire, a connection jack can be inserted which can be disassembled and assembled easily and quickly by the user, which is of considerable importance if the user requires to remove himself from the telephone apparatus. In such a case, the connection jack can be de-coupled and coupled quicker and easier than the jack connection which lies between the wire and the telephone apparatus, and which normally has some form of locking arrangement.

FIG. 4 shows a block diagram of a circuit which is built into the headset 1, and which serves to create connection from the headset microphone 10 and receiver 11 to a jack connection on a telephone apparatus, in that the circuit contains the necessary amplification and adjustment circuits.

The block diagram shown contains two main signal paths, i.e. a transmission signal path or TX signal path and a receive signal path or RX signal path. Furthermore, the block diagram contains a digital control circuit in the form of a micro-controller 35, an internal source of power in the form of a battery 34 and various auxiliary circuits and components. In FIG. 4, stippled lines indicate the connections with which regulation or control signals are transferred between the individual blocks. In the following, the parts included in the block diagram will be explained in more detail with reference to FIG. 4.

To the left in FIG. 4 is shown the headset's jack connection 31, which connects the jack connection on a telephone to the headset, i.e. if the telephone is provided with such a jack, or to the telephone's jack for the handset. This jack can be a standard telephone jack with four poles, i.e. two for microphone or TX leads and two for receiver or RX leads. The jack 31 is connected by a four-conductor lead to a four-poled multi-position changeover switch 32, which in the example embodiment is configured as a changeover switch with seven positions in all. As will be explained in more detail later, this multi-position changeover switch serves to establish correct connections between the TX leads and RX leads in the jack 31 and the respective connections in the TX and RX signal paths to the microphone 10 and the receiver 11.

The transmission or TX signal path comprises a preamplifier 20, which receives the TX signal from the microphone 10. The signal from the preamplifier is fed to an electronic microphone switch (mute switch) 21, which, controlled by the micro-controller 35, can cut off or suppress the TX signal from the microphone. In practice, the TX signal will be attenuated by the mute switch by more than e.g. 80 dB.

From the mute switch 21, the TX signal is fed to a TX voice-activated switch 22, which is an electronic switch which to a certain extent can reduce the amplification of the TX signal, for example by approx. 11 dB, when the TX signal lies below a certain level. The switching is controlled by a noise detector (squelch detector) 26, which is supplied with the TX signal from the microphone 10 via a separate preamplifier 25. When the TX signal falls below a certain level, as indicated by the stippled lines the noise detector 26 will send a control signal to the TX voice-activated switch 22, so that the amplification is reduced. This results in the background noise from the TX side being reduced in the circuit.

From the TX voice-activated switch 22, the TX signal is fed to an electronic volume control 23, which, as indicated by a stippled line, is controlled from the micro-controller 35. Hereafter, the signal is fed to an output amplifier 24, which, as shown by stippled lines, can receive control signals from a DC-level detector 30 and a TX-AGC detector 27, the functions of which will be described in the following. The TX-AGC detector 27 (AGC=automatic gain control, i.e. automatic level regulation) receives the output signal from the output amplifier 24 and controls the amplification of this depending on the level, so that distortions do not arise with higher levels of the signal.

From the output amplifier 24 the signal is also sent to an electret interface 28 and a carbon interface 29, only one of which is included in the TX signal path, in that the coupling-in of these interface circuits is controlled by the setting of the multi-position switch 32. The electret interface 28 determines the impedance level and adjusts the DC- and AC-voltage levels so that these are suitable for a host telephone with an electret or an electro-dynamic microphone, while the carbon interface 29 correspondingly determines the impedance level and adjusts the DC- and AC-voltage levels so that these are suitable for a host telephone with a carbon microphone.

The output signal from the carbon interface 29 is fed to the DC-voltage detector 30, in that this determines whether there is a DC-voltage stemming from the host telephone existing at the output of the carbon interface 29. If this is the case, the multi-position switch 32 must be set in a carbon position, and the micro-controller 35 sets the circuit in a carbon state. A control signal from the DC-voltage detector 30 is fed further to the output amplifier 24, so that this is adapted to a host telephone with carbon microphone. Finally, as indicated by the stippled line, a control signal is fed from the carbon interface 29 to the micro-controller 35.

The output signals from the electret interface 28 and the carbon interface 29 are fed to the multi-position switch 32, where one of the signals, depending on the setting of the multi-position switch 32, is fed further to the headset's jack 31 and from here to the host telephone.

The receive or RX signal path will now be explained in more detail. An RX-signal arriving from the host telephone is fed via the multi-position switch 32 to a differential preamplifier 40. From here, the output signal is fed to an amplifier 41 for the receiver, and to an amplifier 48 which supplies a receive detector 50 and a line quieting detector 49. The function of these two detectors will be explained later. The output signal from the amplifier 41 is fed to an electronic volume control 42, which, as indicated by the stippled line, is controlled from the micro-controller 35.

The output signal from the volume control 42 is fed to an RX voice-activated switch 45 and an RX-AGC detector 43 and also to a continuous tone detector 44. As indicated by the stippled lines, these two detectors 43 and 44 serve to regulate the automatic gain control (AGC) of the preamplifier 40 with the object of preventing discomfort or even injury to the ear of the user at high volumes, in that the RX-AGC detector 43 detects high peak values, while the detector 44 for continuous tone detects continuously high levels.

The RX voice-activated switch 45 is an electronic changeover switch which to a certain extent can reduce the amplification of the RX signal, e.g. by approx. 11 dB, when the RX signal is below a certain level. The switching is controlled by means of the receive detector 50, in that as shown by the stippled line this will send a signal to the micro-controller 35 when the RX signal is below the determined level, after which a control signal from the micro-controller 35 will cause the switch 45 to reduce the amplification of the RX signal. The background noise from the telephone line will hereby be reduced.

The output signal from the RX voice-activated switch 45 is fed to a band-pass filter (presence filter) 46, which is centred around approx. 800 Hz, and which in its pass-band contains frequencies, which exist primarily in speech sounds. This band-pass filter will thus accentuate the frequencies in question and will thus have the effect of a filter, which accentuates or makes the speech sounds in the received signal clearer. As indicated by the stippled line, the band-pass filter 45 can be coupled in or out of the RX path, controlled from the micro-controller 35.

The RX signal is finally fed from the band-pass filter 46 to an output amplifier 47 and from here to the receiver 11. The amplification in the output amplifier can be reduced, controlled by the above-mentioned line-quieting detector 49 as indicated by the stippled line. The line-quieting detector 49 detects the level of the RX signal, and providing that this lies below a certain level, this will be an indication that the headset is not in use at the relevant time. If this state is maintained in excess of a predetermined period of time, this will result in a control signal being sent to the output amplifier 47, in which the amplification is reduced, possibly so much that the output amplifier is completely closed down, so that the noise from the telephone line is removed from the RX signal path. When the line-quieting detector 49 again registers a signal above the determined level, the amplification in the output amplifier is increased again.

The multi-position changeover switch 32, which as mentioned is placed in the headset under the ear pad 9, is configured as a rotary switch with seven positions which correspond to seven different settings or applications of the headset.

One of these positions of the switch 32 corresponds to the situation in which the headset is coupled to a host telephone with a carbon microphone. In this position, the wires, which constitute the TX signal path, from the headset's jack 31 are connected through the multi-position switch 32 to the output of the carbon interface 29.

The remaining six positions of the switch 32 correspond to the situation in which the headset is coupled to a host telephone with an electret or electro-dynamic microphone. In these positions, the wires, which constitute the TX signal path, from the headset's jack 31 are connected through the multi-position switch 32 to the output of the electret interface 28. These six positions differ from one another in the manner the four connection wires, which comprise the TX and RX signal paths, are coupled respectively from the electret interface 28 and the differential pre-amplifier 33 through the multi-position switch 32 to the respective poles in the headset's jack 31, corresponding to host telephones with different ways of placing these connections in the jack of the host telephone. Consequently, the connection from the circuit to the individual poles in the headset jack 31 is determined with the multi-position switch 32. If these poles are designated with the numbers from 1 to 4, and the four connection wires with "m" for single-poled microphone wire and "r" for single-poled receiver wire, the positions of the switch 32 used will result in the following connections in the headset's jack 31, in that the positions are designated pos. A–pos. F:

| Position | Pole no. 1 | Pole no. 2 | Pole no. 3 | Pole no. 4 |
|---|---|---|---|---|
| Pos. A | m | r | r | m |
| Pos. B | r | m | m | r |
| Pos. C | m | m | r | r |
| Pos. D | r | r | m | m |
| Pos. E | m | r | m | r |
| Pos. F | r | m | r | m |

For the position of the switch 32 where the TX signal path is coupled through the carbon interface 29, the corresponding connection in the headset's jack 31 will conform to Pos. A above.

Finally, in the circuit in FIG. 4 there is provided a power supply 33 for analogue circuits, a stand-by and sleep circuit 38, a battery low detector 36 and an oscillator 37.

The battery low detector registers, for example by voltage measurement, combined voltage/current measurement or other well-known methods, when the battery's remaining capacity has been reduced to a predetermined low level, and it is desired to indicate to the user that the battery must be replaced. In such a case, a control signal is sent to the oscillator 37, which depending on this signal sends a signal of, for example, 2 kHz to the receiver 11, e.g. with a recognisable and identifiable sound pattern which indicates to the user that the battery must be changed.

Controlled by the microprocessor 35, the oscillator 37 can also be used to send signals with other sound patterns to the receiver to indicate other conditions of the headset to the user, which will be discussed more fully later.

The stand-by and sleep circuit 38 detects whether the headset is in use, and after a given period of time in which there has not been ascertained any activity in the headset circuit, sets the headset in the stand-by state. In this state, the headset can be activated if activity on the telephone line is ascertained, which is detected by the receive detector 50. When the headset has been in the stand-by state for a given period of time, the headset is set in a sleep state, in which it is necessary to effect a manipulation of one of the controls on the headset in order to bring the headset back into function again. A saving in the battery capacity is hereby achieved, in that the headset automatically closes down into the battery-saving stand-by state after a given period of time, and in that after another given period without activity the headset automatically closes down into a more or less current-free state.

The power supply 33 supplies the analogue circuits with the necessary electrical energy and with the required voltages from the battery 34. The actual current connections from the power supply 33 to the relevant components in the block diagram are not indicated in FIG. 4.

As mentioned earlier, the headset is provided with two buttons for operation, i.e. a button 14 for operation of the microphone switch and a button 15 for the setting of the volume. These buttons are connected to the micro-controller 35, which connections are not shown in FIG. 4, so that these buttons can be used to send control signals to the micro-controller, which then sends control signals to the relevant components in the circuit.

The button 14 is used primarily for operation of the microphone switch 21, in that a short pressing of the button will result in the micro-controller 35 sending a control signal to the microphone switch 21, which is thus activated. At the same time, the micro-controller will send a control signal to the oscillator 37, so that a certain sound pattern is heard in the receiver, which indicates to the user that the microphone is disconnected. This sound pattern can, for example, be repeated at regular intervals, so that the user will always be aware that the microphone is disconnected. The microphone connection can be restored again by another short pressing of the button 14.

The button 15 is used primarily for the regulation of the volume of the received signal, in that a pressing on the one end of the button will result in a signal being sent from the micro-controller 35 to the volume control 42 so that the signal is attenuated, while a pressing of the other end of the button will result in a signal being sent from the micro-controller 35 to the volume control 42 so that the signal is increased. If the minimum or the maximum level is reached during the activation of the button 15, a control signal will be sent from the micro-controller to the oscillator 37, so that a sound with a pattern corresponding to the respective state will be heard in the receiver 11.

The buttons 14 and 15 can be used secondarily for controlling the other functions of the headset. A simultaneous activation of both ends of the button 15 will thus result in a control signal being sent from the micro-controller to the band-pass filter 46, whereby this is coupled in, at the same time that the micro-controller sends a control signal to the oscillator, whereby a sound is heard in the receiver 11 with a pattern which indicates to the user that the filter has been coupled in. Conversely, a subsequent simultaneous activation of both ends of the button 15 will result in the band-pass filter 46 being de-coupled again, at the same time that a sound of a certain pattern is again sent by the receiver 11 to indicate that the filter has now been de-coupled. The user may, for example, wish to use the band-pass filter 46 when a telephone call with a great deal of noise is received, or when it is difficult to hear the other person. In these cases the band-pass filter will increase the intelligibility of the incoming call.

If the button 14 is activated for longer than a brief period, e.g. if the button is held pressed down for more than approx. 3 seconds, the headset will switch to a set-up state, which from the micro-controller via the oscillator 37 and the receiver 11 is indicated by a special set-up sound signal. In this state, the button 15 can be used to adjust the level of the TX signal from the microphone 10, in that activation of one of the button's ends will result in a corresponding control signal being sent from the micro-controller 35 to the volume control 23, whereby the level can be adjusted up or down. In the same manner as with the regulation of the receiver volume, a sound with special sound pattern will be heard in the receiver when the volume reaches the minimum or the maximum level. But also during up or down regulation of the microphone volume, sound patterns will be transmitted which will indicate to the user that the volume is regulated respectively up or down. This is expedient in that changes in the volume cannot be ascertained by the user himself, who is dependent upon a connection being established via the host telephone to another person who can thus provide instructions concerning the setting while the user speaks into the headset.

Moreover, in the set-up state, the RX voice-activated switch 45, which is normally coupled and which serves to reduce background noise in the received signal, can be de-coupled if this is desired by the user. This is effected by the button 14 again being pressed down for more than approx. 3 seconds. The switch 45 is hereby de-coupled from the TX signal path, and at the same time a special sound signal in the receiver 11 will indicate that the RX voice-activated switch 45 has been de-coupled. Conversely, if the user wishes to couple this switch back in again, in the set-up state this can be done by activating the button 14 for more than approx. 3 seconds, whereby the switch 45 will be coupled in again, which is again indicated by a special sound signal.

Finally, in the set-up state, the user can effect the setting of the multi-position switch 32, which is undertaken when the headset is coupled to a telephone apparatus (if the actual setting is not known, e.g. from a survey covering known types of telephones with indication of associated setting of the headset). With the ear pad 9 removed, so that the multi-position switch is accessible, and the headset coupled to the host telephone, the headset is set in the set-up state. Hereafter, the multi-position switch is turned until the host telephone's clear tone can be heard in the headset receiver 11. With the multi-position switch in this position, the microphone connection is tested, for example by blowing into the headset microphone 10. If this cannot be heard in the receiver 11, the multi-position switch 32 is moved to the next position, where the host telephone's clear tone can be heard in the receiver 11, and in this position the microphone connection can be tested again. This is repeated until a position is found in which both the TX and RX connection are in order. Hereafter, the TX and RX volumes are set for the headset as explained earlier.

The headset leaves the set-up state again if the button 15 has not been activated within a certain period of time, e.g. approx. 10 seconds. Moreover, the headset can actively be brought out of the set-up. state by brief activation of the button 14. When the headset leaves the set-up state, a sound signal corresponding hereto is sent by the receiver 11.

What is claimed is:

1. Headset for connection to a telephone apparatus, said headset comprising a capsule having an ear facing side and an exterior side, and ear pad, said headset including a built-in receiver, a boom with a microphone moveably extending therefrom, said headset being connected to a telephone apparatus , and with which headset there are associated amplification and adjustment circuits for both the microphone and the receiver, manually operable elements for the setting of said amplification and adjustment circuits, and switching selection elements for adjusting the headset to accept phone systems of differing electronic characteristics wherein the amplification and adjustment circuits are built into the capsule, and in that the manually operable being within capsule, and wherein the switch elements include a plurality of switches—which are placed on the exterior of the capsule in such a manner that it is accessible to a user, said capsule and said ear pad having generally similar circumferential extents.

2. A headset according to claim 1 wherein said capsule further includes a battery drawer for receiving a battery, and wherein said drawer is contained completely within said capsule.

3. A headset according to claim 1 wherein one of said switches is coupled to a band pass filter and wherein activation of said switch will couple and decouple said filter.

4. A headset according to claim 1 wherein activation of at least two switches causes the headset to enter a set-up mode for user adjustment of features.

5. A headset according to claim 1 wherein said microphone boom is pivotally extending from said exterior side of said capsule.

6. A headset according to claim 1 wherein at least one of said switches is configured to change the polarity of a connection to the phone system to which the headset is connected.

* * * * *